United States Patent [19]

Turner et al.

[11] 4,247,122
[45] Jan. 27, 1981

[54] DUST SEALING MECHANISM

[75] Inventors: Terry L. Turner; Robert A. Meloni, both of Baltimore, Md.

[73] Assignee: Black & Decker Inc., Newark, Del.

[21] Appl. No.: 8,292

[22] Filed: Jan. 31, 1979

[51] Int. Cl.³ ........................ B23B 31/04; E21C 7/00
[52] U.S. Cl. ..................................... 277/33; 74/18.2; 175/211
[58] Field of Search .................. 277/33, 32, 153, 157, 277/212, 212 C

[56] References Cited

U.S. PATENT DOCUMENTS

| 2,859,993 | 11/1958 | Estey ..................................... 277/33 |
| 2,944,523 | 7/1960 | Werstein . |
| 3,333,578 | 8/1967 | Muller ..................................... 277/33 |
| 3,490,428 | 1/1970 | Updike et al. .......................... 277/33 |
| 3,934,661 | 1/1976 | Sauerwein et al. ................... 175/211 |
| 3,984,192 | 10/1976 | Wanner et al. ...................... 208/226 |
| 4,002,079 | 1/1977 | Hall ..................................... 74/18.2 |

FOREIGN PATENT DOCUMENTS

| 2653082 | 5/1978 | Fed. Rep. of Germany . |
| 48-87686 | 10/1973 | Japan . |
| 49-118177 | 10/1974 | Japan . |
| 53-76109 | 6/1978 | Japan . |
| 54-11902 | 1/1979 | Japan . |
| 1030137 | 5/1966 | United Kingdom . |

*Primary Examiner*—Robert I. Smith

*Attorney, Agent, or Firm*—Leonard Bloom; Edward D. Murphy; Harold Weinstein

[57] ABSTRACT

A dust seal for a tool device, including a bit receiving end, which comprises typically, an elastomeric material such as neoprene and includes a bit clamping or first end portion having a first axially extending opening of predetermined dimension and having a shape and contour which complements and cooperates with the aligned surface of the tool bit. The predetermined dimension is selected so as to create a first interference fit with the tool bit. The seal includes a tool connection or second end portion axially disposed from the first and connected thereto. The latter includes a second axially extending opening, again of predetermined dimension which has a shape and contour which complements and cooperates with the aligned surface of the bit receiving end. The dimension of this second opening is selected to provide a second interference fit with the aligned surface of the bit receiving end, the second interference fit being lighter than the interference fit formed between the first end portion of the seal and the bit shank. The difference in interference fits allows the seal to move substantially in unison with the bit while slipping upon the contacted surface of the bit receiving end. Cooperative action between a surface of the second end portion and a flange on the bit receiving end ensures retention of the seal upon the tool device when the bit is removed from the tool.

7 Claims, 4 Drawing Figures

4,247,122

DUST SEALING MECHANISM

FIELD OF THE INVENTION

This invention pertains to dust sealing mechanisms for power tools in general, and more particularly, to a seal to be employed with overhead hammer or hammer/drilling type tools.

BACKGROUND OF THE INVENTION

Dust sealing mechanisms for power tools such as hammers or drills protect the particular tool device from the incursion of fine dust, chips, debris and the like which can cause premature failure of the tools.

Typically, in the prior art, it has been the practice to provide such dust seals as units mounted with a particular tool bit which is thereafter inserted into the tool and likewise removed when the bit is removed from the unit. Since the seal is placed on the bit shaft before insertion, obviously, when a tool bit must be replaced, the seal must be removed from the older bit and placed on the new one.

Often times, in purchasing power tools of the nature employing the seals which are the subject of the present invention, the operator will have to likewise buy several such dust seal units to replace the ones which are inadvertently lost or discarded with the used bits.

Further, it is often desirable to not only perform a hammering function on the surface being worked, but, in addition, a drilling function for removing previously loosened material. In such applications, it is necessary to provide a dust seal which will rotate with the bit but still not be destroyed so as to have to be discarded prematurely.

It is therefore a primary object of this invention, to provide a dust seal which remains on the tool when the bit is removed so that the problem of loosing or inadvertently discarding the seal is eliminated.

It is yet another object of this invention to provide a seal which not only has application to power hammers, but also to hammer-drilling tools.

It is still another object of this invention to provide a dust seal mechanism which can be easily snapped off for replacement when required, but, under typical operating conditions, remains with the tool.

Various types of dust seals have been patented and occur in the prior art. These generally are designed around particular tools and have limited application. Such dust seals or protectors have been disclosed in U.S. Pat. Nos. 2,944,523 and 3,934,661 assigned to the assignee hereof and Great Britain Pat. No. 1,030,137.

SUMMARY OF THE INVENTION

Towards the accomplishment of the aforementioned objects and others which will become apparent from the following specification taken together with the accompanying drawings, there is disclosed a dust sealing mechanism for any tool device, including a bit receiving means having a flanged portion thereon, the dust seal portion having a first end portion including a first, axially extending opening of predetermined dimension and having a shape and contour which complements and cooperates with the surface of the inserted tool bit to provide a first interference fit. The dust seal portion of the invention further includes a second end portion axially disposed from said first end portion and connected thereto, the second end portion including a second, axially extending opening, again of predetermined dimension and having a shape and contour which complements the cooperating surface of the tool bit receiving means so as to provide a second interference fit therewith. This interference fit is lighter than the first interference fit whereby the seal is allowed to move substantially in unison with the bit while slipping upon the contacted surface of the bit receiving means. The breadth across said second opening is less than the breadth across the flange portion of the bit receiving means resulting in the seal being restrained from removal from the bit receiving means when the bit is axially removed therefrom.

The second end portion may include a pair of annular sections axially disposed one to the other, said annular sections defining the aforementioned, second, axially extending opening. This arrangement with proper design ensures a lighter interference fit at the contact area with the bit receiving means vis-a-vis the interference fit at the bit shank.

BRIEF DESCRIPTION OF THE DRAWINGS

The drawings to be considered in discussing the present invention are as follows.

DESCRIPTION OF PREFERRED EMBODIMENT

Figure 1:
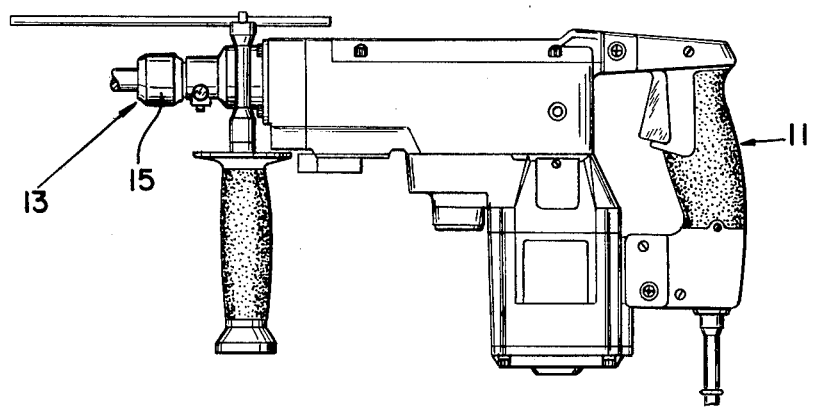
FIG. 1 is an elevational view of a tool which employs the present invention and which shows the relation therebetween.

Referring to FIG. 1 there is shown a tool device 11 which employs the seal of the present invention. It may be a reciprocating mechanism such as a power hammer or a reciprocal/rotational device, such as a rotary hammer. The device includes a bit receiving end 13 upon which is disposed the dust seal 15 of the present invention. As noted above, the seal is part of the tool device as opposed to the prior art configurations wherein it was included with the tool bit.

Figure 4:
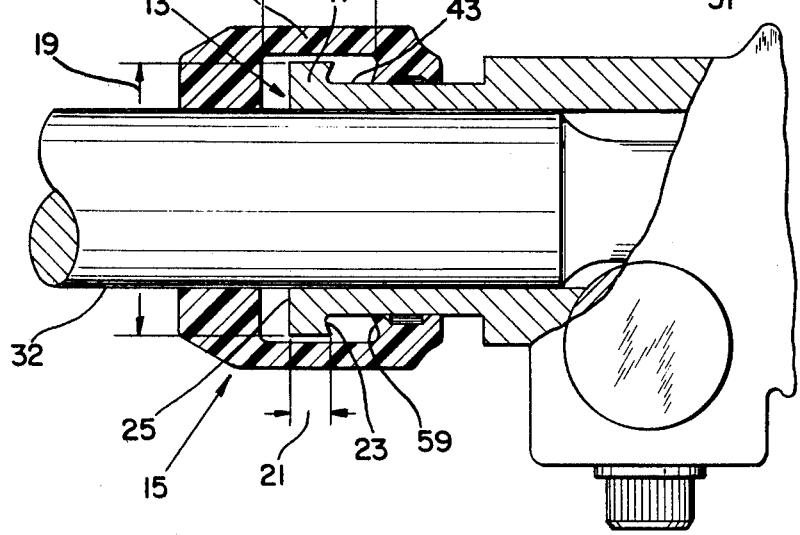
FIG. 4 is a side elevation view, in section, showing the dust seal in place on the bit receiving end of the tool with the bit in place.

Referring briefly to FIG. 4, the details of the bit receiving end 13 are disclosed. It is seen to include a flanged portion 17 which, typically, annularly extends about the barrel of the bit receiving end. The breadth of the flange as defined by the dimension, 19 for a typical application would be on the order of 1.21 inches (30.7 mm). The axial thickness of the flange 21 generally for a typical application would be 0.15 inches (3.8 mm). The flange is seen to include in the mode described, an angled surface 23 which cooperates with the seal in a manner to be described. The surface 23 is seen to be angled axially away from the bit receiving opening 25.

Returning now to FIG. 2, the dust seal is seen to comprise a bit clamping or first end portion 27 having a first opening 29 which extends an axial distance 31. The opening 29 is of predetermined shape and contour to complement and cooperate with the shank 32 (see FIG. 4) of an inserted tool bit. This may be circular, hexagonal or any other shape typically found with respect to bits used in such tool devices.

The opening 29 is of predetermined dimension so as to provide an interference fit with the inserted bit. For example, where the bit has a circular shank, having a diameter on the order of 0.75 inches (19 mm), the diameter 33 of the opening 29 typically would fall between 0.72 inches (18.3 mm) and 0.725 inches (18.4 mm). The axial distance 31 for such an application might typically be on the order of 0.32 inches (8.12 mm).

The dust seal further comprises a tool connection or second end portion 35 axially disposed from end 27 and connected therewith by annular portion 37. The second end portion 35 includes a second opening 39 which extends an axial distance 41.

The second opening is also of predetermined shape and contour which complements and cooperates with the aligned surface 43 (see FIG. 4) of the bit receiving end 13. The second opening also is of predetermined dimension so as to provide a second interference fit with the aligned surface 43. For example, where the latter surface is circular, within the dimensional scheme described above, its outer diameter typically might be 1.02 inches (25.91 mm). The diameter 45 of the opening of the seal would be anywhere from 1.010 inches (25.65 mm) to 1.015 inches (25.78 mm). This results in a second interference fit which is lighter than the one between the first opening and the bit shank. The result is that the seal moves substantially in unison with the bit while slipping upon the contacted surface 43 of the bit receiving end. This is not only the case for any reciprocating mechanisms such as a power hammer but also for a tool device which employs rotary movement or a combination of the both.

Figure 2:
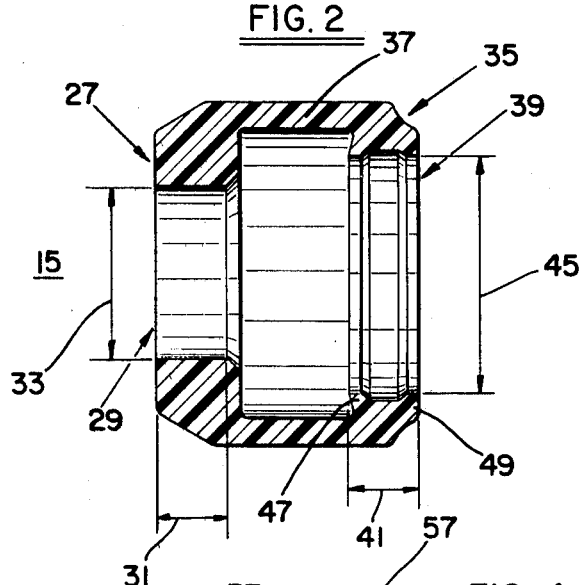
FIG. 2 is a side elevational view in section of the dust seal of the present invention.
Figure 3:
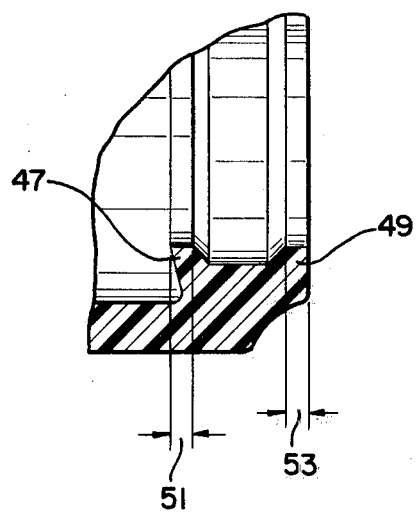
FIG. 3 is an enlarged partial detail of a portion of FIG. 2.

FIG. 2 depicts the best mode presently contemplated for effecting the interference fit between the second end portion and the aligned surface 43 of the bit receiving end. The second end portion is seen to include a pair of annular ribs or sections 47 and 49 which are axially disposed one to the other within the axial distance 41. The latter, typically, again with the framework of the aforedescribed dimensional system, is typically on the order of 0.28 inches (7.11 mm) to 0.29 inches (7.37 mm). FIG. 3 is a blow-up of a portion of this second end portion employing the pair of annular sections.

By configuring the second end portion so as to include the pair of annular sections, the contact surface between the dust seal and surface 43 of the bit receiving end is significantly reduced. Typically, the axial length 51 and 53 of each of the sections 47 and 49 respectively, are on the order of 0.050 inches (1.27 mm) to 0.06 inches (1.52 mm). When it is considered that the axial length of the first opening 31 which is in contact with the bit shank is on the order of 0.32 inches (8.12 mm), it becomes readily apparent that the interference fit between the second opening and the surface 43 is significantly lighter than the fit between the seal and the bit shank.

From FIG. 3, it is seen that the annular sections 47 and 49 are angled axially towards and away from the front end or first end portion of the seal. This guarantees a seal between the section and the surface 43 while minimizing the drag at this point.

FIG. 4 illustrates that the annular portion 37 is of sufficient axial length to accommodate the total axial displacement of the bit during its operation. This not only includes the work mode, but also an idle mode which, for certain type power hammers, results in the bit being thrust an additional axial distance to the left as viewed in FIG. 4.

In FIG. 4, the dust seal is shown to be placed on a tool device which includes a bit receiving end 13 having a flanged portion 17 as noted above. The flange is seen to be axially interposed between portions 27 and 35 when the seal is in place on receiving end 13. Further, because of the flange, the portion 37 of the seal must also include a length equal to the axial length 21 of the flange. The axial length 57 of the portion 37, again equals the total axial displacement of the bit during its various operational modes, including its idle mode, plus the axial length 21 of the flange 17.

To further effect the purposes of this invention, the flange 17 of the bit receiving end includes the angled surface 23 which cooperates with the surface 59 of the seal to facilitate retention of the seal on the bit end. These cooperating surfaces are seen to be angled axially away from the bit receiving opening 25 of the bit end 13. Suffice it generally, that the breadth across the opening 39, for example, the diameter 45 is less than the breadth 19 across the flange 17.

The seal 15 is typically molded from an elastomeric material such as neoprene which makes it substantially impervious to damage because of its one piece molded construction. Obviously it is inexpensive to make but yet achieves its intended purposes without undue complexity.

The bit automatically locates and positions the dust shield 15 on itself during both a reciprocal and rotational movement.

Initially, the seal is placed on a unit with the opening 39 contorted by the operator and eased over the flange 17. Once installed on the unit or device, tool bits are inserted and removed with the seal remaining in place on the device. When the seal must be replaced, it is easily snapped off and a new dust seal installed.

Other modifications and variations to the embodiment described will now be apparent to those skilled in the art. However, the aforedescribed embodiment is not to be construed as limiting the breadth of the present invention. The full scope and extent of the present contribution can only be appreciated in view of the appended claims.

What is claimed is:

1. A dust sealing mechanism for a hammering power tool having a housing in which is mounted a motor connected therein selectively to drive reciprocally and/or rotatingly a tool bit detachably carried by the housing, the dust sealing mechanism comprising:
   (a) a dust seal member having a hollow axial length along which is formed a bit clamping portion, a tool connection portion, and an intermediate space therebetween extending predetermined axial and radial distances to define an interior chamber therein,
   (b) a tool bit receiving end formed on the housing and having an opening for the tool bit to be inserted and retained therein,
   (c) a holding flange formed on said tool end of the housing and adapted to extend into the interior chamber of the dust sealing member,
   (d) the tool connection portion of the dust seal member carried on the tool bit receiving end of the housing inwardly of the holding flange and normally prevented from disengagement therewith by the holding flange, and forming a light interference fit with the tool bit receiving end to permit the dust seal member to partake of the same motion as that of the tool bit relative to the housing whenever the tool bit is connected to the housing, and thereby is adapted to partake of the reciprocal and/or rotary motion of the tool, and (e) the bit clamping portion of the dust seal member engaging the tool bit upon insertion thereof into the housing opening and to form a heavy interference fit with the tool bit whereby the dust seal member is substantially clamped to the tool bit normally to move in unison therewith.

2. The combination claimed in claim 1 wherein:
the bit clamping portion of the dust seal member has a cross-sectional area smaller than the corresponding cross-sectional area of the tool bit to provide a clamped engagement between the bit clamping portion and the tool bit subsequent to the tool bit being connected to the housing whereby a heavy interference fit is defined therebetween.

3. The combination claimed in claim 2 wherein:
(a) the dust seal member defines an annular member, with the diameter of the bit clamping portion of the smallest diameter, the tool connection portion of intermediate diameter and the chamber diameter the largest,
(b) the tool bit receiving end is substantially circular and the diameter slightly greater than the diameter of the tool connection portion of the dust seal to define a light interference fit therebetween, and
(c) the holding flange has a diameter substantially greater than the diameter of the tool connection portion of the dust seal member, and less than the diameter of the chamber of the dust seal member.

4. The combination claimed in claim 3 wherein:
(a) the holding flange and the tool connection portion of the dust seal member coact normally to prevent the dust seal member from being removed from the housing with or without the tool bit being connected to the housing,
(b) the holding flange having an inner edge flaring inwardly and upwardly away from the end of the housing,
(c) the edge of the tool connection portion flaring outwardly and downwardly toward the end of the housing to coact with the inner edge of the flange and defines therewith complementary surfaces, and
(d) the complementary surfaces coact to assist in retaining the dust seal member on the bit receiving end of the housing.

5. The combination claimed in claim 3 wherein:
(a) the tool connection portion includes a pair of inwardly extending annular ribs axially spaced from each other, and
(b) the annular ribs provide a reduced contact with the exterior surface of the bit receiving end of the housing to further aid in forming the light interference fit therewith.

6. The combination claimed in claim 5 wherein the pair of annular ribs are angled away from each other at a predetermined angle, thereby reducing the drag between the contact surface of the annular ribs and the exterior surface of the bit receiving end while maintaining the seal therebetween.

7. The combination claimed in any of claims 1 through 6 wherein the dust seal member is made of a resilient material.

* * * * *